(12) United States Patent
Grebel

(10) Patent No.: US 11,077,892 B2
(45) Date of Patent: Aug. 3, 2021

(54) ACTIVELY DISPLACEABLE WHEEL SPOILER HAVING OVERLOAD PROTECTION BY WAY OF A DEFLECTION ELEMENT

(71) Applicant: Röchling Automotive SE & Co. KG, Mannheim (DE)

(72) Inventor: Karsten Grebel, Bürstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 124 days.

(21) Appl. No.: 16/562,932

(22) Filed: Sep. 6, 2019

(65) Prior Publication Data

US 2020/0094888 A1    Mar. 26, 2020

(30) Foreign Application Priority Data

Sep. 24, 2018    (DE) .................... 10 2018 123 487.2

(51) Int. Cl.
*B62D 35/00*    (2006.01)
*B62D 35/02*    (2006.01)

(52) U.S. Cl.
CPC ........... *B62D 35/005* (2013.01); *B62D 35/02* (2013.01)

(58) Field of Classification Search
CPC ....... B62D 35/005; B62D 35/02; B62D 37/02
(Continued)

(56) References Cited

U.S. PATENT DOCUMENTS 4,683,974 A * 8/1987 Richardson .............. B60Q 1/52
                                                                    180/274

9,132,793 B2    9/2015  Nickel et al.
(Continued)

FOREIGN PATENT DOCUMENTS

DE    202011005504 U1    12/2011
WO    2018109311 A1    6/2018

OTHER PUBLICATIONS

German Search Report for corresponding DE 10 2018 123 487.2 dated Jun. 14, 2019, 9 pgs.

(Continued)

*Primary Examiner* — Gregory A Blankenship
(74) *Attorney, Agent, or Firm* — Rankin, Hill & Clark LLP

(57) ABSTRACT

A wheel spoiler arrangement, encompassing: a wheel spoiler carrier; a wheel spoiler received displaceably relative to the spoiler carrier between inactive and active positions constituting operating positions; a motion guide arranged between the spoiler carrier and the wheel spoiler and guides the displacement of the wheel spoiler between its operating positions; a displacement drive system which is coupled motion-transferringly to the wheel spoiler by a coupling member that drives the wheel spoiler relative to the spoiler carrier to perform a displacement motion between its operating positions; the coupling member is a reversibly deformable component arrangement which has a first predetermined conformation under an operational load that does not exceed a predetermined limit load and which is embodied to deform into a second conformation, different from the first conformation, under an extraordinary load that exceeds a predetermined limit load, the reversibly deformable component arrangement being deformable from the second conformation back into the first conformation.

18 Claims, 6 Drawing Sheets

(58) Field of Classification Search
USPC .......................................... 296/180.1, 180.5
See application file for complete search history.

(56) References Cited

U.S. PATENT DOCUMENTS

| | | | | |
|---|---|---|---|---|
| 9,764,706 | B2* | 9/2017 | Benvenuto | B62D 35/008 |
| 2013/0238198 | A1* | 9/2013 | Prentice | B62D 35/02 |
| | | | | 701/49 |
| 2015/0084369 | A1* | 3/2015 | Niemi | B62D 37/02 |
| | | | | 296/180.1 |
| 2016/0229467 | A1* | 8/2016 | Miller | B62D 35/005 |
| 2017/0101136 | A1* | 4/2017 | Zielinski | B62D 35/005 |
| 2017/0106922 | A1* | 4/2017 | Povinelli | B62D 35/02 |
| 2017/0355403 | A1* | 12/2017 | Grebel | B62D 35/005 |
| 2018/0134332 | A1* | 5/2018 | Cha | B62D 35/02 |
| 2018/0162459 | A1* | 6/2018 | Abdoul Azizou | H02P 6/182 |
| 2019/0002039 | A1* | 1/2019 | Cha | B62D 35/005 |
| 2019/0061839 | A1 | 2/2019 | Schmitt et al. | |
| 2019/0152543 | A1* | 5/2019 | Shiga | B62D 35/005 |
| 2019/0248429 | A1* | 8/2019 | Parra | B62D 35/007 |
| 2020/0010128 | A1* | 1/2020 | Herlem | B62D 37/02 |
| 2020/0094888 | A1* | 3/2020 | Grebel | B62D 35/005 |
| 2020/0094889 | A1* | 3/2020 | Shiga | B62D 35/005 |
| 2020/0164934 | A1* | 5/2020 | Shiga | B62D 35/005 |
| 2020/0189668 | A1* | 6/2020 | Urbach | B62D 35/005 |
| 2021/0009210 | A1* | 1/2021 | Matthews | B62D 35/005 |

OTHER PUBLICATIONS

Espacenet Bibliographic data:DE 202011005504 (U1), Published Dec. 15, 2011, 1 pg.
Espacenet Bibliographic data:WO2018109311 (U1), Published Jun. 21, 2018, 1 pg.

* cited by examiner

ACTIVELY DISPLACEABLE WHEEL SPOILER HAVING OVERLOAD PROTECTION BY WAY OF A DEFLECTION ELEMENT This Application claims priority in German Patent Application DE 10 2018 123 487.2 filed on Sep. 24, 2018, which is incorporated by reference herein.

The present invention relates to a wheel spoiler arrangement for a motor vehicle, encompassing: a wheel spoiler carrier; a wheel spoiler received displaceably relative to the wheel spoiler carrier between an inactive position and an active position constituting operating positions; a motion guide which is arranged between the wheel spoiler carrier and the wheel spoiler and guides the displacement of the wheel spoiler between its operating positions; and a displacement drive system which is coupled motion-transferringly to the wheel spoiler by a coupling member and is embodied and arranged to drive the wheel spoiler relative to the wheel spoiler carrier to perform a displacement motion between its operating positions.

BACKGROUND OF THE INVENTION

Wheel spoilers of this kind are well known in automotive engineering. Wheel spoilers serve to reduce the air resistance of a vehicle in the region in front of its front wheels.

The wheel spoiler extends over much of the motor vehicle's width in the front end region of the vehicle, in the region of the underside of the vehicle body. At lower vehicle speeds, for example when driving in built-up areas, the wheel spoiler is located in the inactive position that projects less into the air flow which impinges upon the motor vehicle when traveling forward. This serves to protect the wheel spoiler from undesired collisions, since objects are present on roadways more frequently in city driving than on main highways, and the vehicle furthermore travels more often over obstacles such as speed bumps or curbs, so that maximum ground clearance is advantageous.

At driving speeds at which no obstacles are to be expected, for example at driving speeds above 70 or 80 km/h, the wheel spoiler is driven by the displacement drive system, and guided by the motion guidance system, to move into an active position that projects farther into the air flow impinging upon the vehicle.

In the active position the wheel spoiler is located closer to the roadway being traveled on by the vehicle than in the inactive position, so that the vehicle has more ground clearance with the wheel spoiler in the inactive position than with the wheel spoiler in the active position.

DE 10 2013 002 307 A1 discloses a front part for a motor vehicle, in which a bumper for decreasing a risk of injury to persons colliding with the motor vehicle is connected to the main body of the motor vehicle via an elastic flexible beam. The flexible beam, constituted from an elastomeric material, deflects elastically In the event of a collision, and returns to its original shape upon cessation of the external collision load. A buffer body of the bumper likewise provided on the front part, conversely, becomes permanently deformed in response to collision forces in order to dissipate energy. The known elastomeric flexible beam is a fourth-order Eulerian flexible beam, i.e. a flexible beam mounted rotatably at both longitudinal ends.

SUMMARY OF THE INVENTION

An object of the present invention is to refine the wheel spoiler arrangement recited initially in such a way that even with the wheel spoiler in the active position, it can withstand with functional integrity a collision with an object located on the roadway, or that its functional integrity can be restored with simple means after the collision.

This object is achieved by the present invention by a wheel spoiler arrangement of the kind recited initially in which the coupling member is a reversibly deformable component arrangement which has a first predetermined conformation under an operational load that does not exceed a predetermined limit load and which is embodied to deform into a second conformation, different from the first conformation, under an extraordinary load that exceeds a predetermined limit load, the reversibly deformable component arrangement being deformable from the second conformation back into the first conformation.

The motion guide in fact serves only that purpose on the wheel spoiler arrangement according to the present invention, i.e. it permits a guided motion of the wheel spoiler between its operating positions (active position and inactive position). The motion of the wheel spoiler between the aforesaid operating positions is brought about exclusively by the displacement drive system through the intermediary of the coupling member.

If the wheel spoiler arrangement were to be imagined hypothetically without the displacement drive system and without the coupling member, an object that is located on the roadway and collides with the wheel spoiler arranged in the active position would simply displace the wheel spoiler in a direction toward the inactive position, so that in principle the wheel spoiler can evade the incoming object utilizing the impact load.

The displacement drive system that is in fact present, however, at first counteracts any such evading displacement of the wheel out of the active position toward the inactive position. Because the coupling member is advantageously embodied as a reversibly deformable component arrangement, the coupling member can become deformed in response to an extraordinarily high collision load and thereby permit the evading displacement of the wheel spoiler.

Under an operational load that occurs in the context of normal, operational, collision-free displacement operation of the wheel spoiler, the coupling member in the first predetermined conformation can transfer drive force from the displacement drive system to the wheel spoiler in order to drive the latter to move into the active position or into the passive position. This ensures conventional collision-free operation of the wheel spoiler. The first conformation is preferably an extended conformation.

When the wheel spoiler in the active position collides with an object located on the roadway being traveled on by the vehicle that carries the wheel spoiler, however, an extraordinary impact-type load occurs which exceeds a predetermined limit load and deforms the coupling member into a second conformation different from the first conformation. The deformation from the first into the second conformation thus makes possible a displacement of the wheel spoiler from the active position toward the passive position. The wheel spoiler is thereby displaceable by the impact-type collision load, when the latter exceeds the predetermined limit load, from the active position toward the passive position, accompanied by deformation of the coupling member. The collision with the object then constitutes a degraded second, external drive source for the wheel spoiler.

The second conformation is preferably a deflected or bent conformation of the coupling member. The distance between longitudinal coupling ends of the coupling member, at which ends the coupling member is couplable on the one hand to the displacement drive system and on the other hand to a part of the motion drive system or to the wheel spoiler, is therefore preferably shorter in the second conformation than in the first.

The limit load can be determined beforehand in the laboratory or on a test track. The limit load is affected by the mass of the impacting object and by the impact speed. Further parameters are the kinematics of the motion guide, and the position and configuration of the coupling member when the wheel spoiler is in the active position. It is thereby possible to adjust the limit load so that lightweight objects do not trigger a displacement of the wheel spoiler even at a higher impact speed. The coupling member is preferably configured in such a way that it becomes deformed, from the first conformation associated with normal operation into the second conformation associated with special operation, only when the impact load approaches the component strength of the wheel spoiler or of the wheel spoiler arrangement.

The return deformation from the second conformation back into the first can be at least partly brought about, or brought about, or initiated, by elastic forces of the coupling member and/or by a predetermined recovery load and/or by a motion of an output member of the displacement drive system which initiates and/or assists the return deformation.

The term "wheel spoiler" refers in the present Application to any motor vehicle component that is displaceable relative to the remainder of the vehicle body, accompanied by a local decrease in the ground clearance of the motor vehicle, in order to redirect an impinging flow of wind blast in the context of straight-line forward travel of the motor vehicle at least also in the region of the front wheels. The wheel spoiler arrangement can therefore comprise two individual air-directing components, one in front of each front wheel, and/or can encompass one air-directing component that has already been recited previously, which extends in front of the front wheels substantially over the vehicle width or at least over much of the vehicle width. The latter air-directing component is also referred to in the relevant technical sector as an "air dam."

The coupling member can be deformed by reversible deflection from the first into the second conformation, and can retain the second conformation either until the collision load no longer exceeds the predetermined limit load and/or until a return deformation is initiated, assisted, or brought about by motion of the displacement drive system.

The motion guide is preferably arranged and embodied in such a way that a displacement of the wheel spoiler from the active position into the inactive position, when considered in the fully installed state on the vehicle, comprises not only a motion component away from the roadway surface, i.e. along the yaw axis of the motor vehicle carrying the wheel spoiler arrangement, but also a motion component in a longitudinal direction of the vehicle, i.e. along the roll axis of the motor vehicle. The result is that an object which, in the context of forward travel, usually strikes the wheel spoiler with a trajectory proceeding principally along the roll axis can displace it gently, despite a severe impact, from the active position into the inactive position.

The kinematics of the motion guide are evident even in the absence of an installed situation of the wheel spoiler arrangement on the motor vehicle. The manner in which the wheel spoiler is to be oriented relative to an air flow impinging on the wheel spoiler from the front is recognizable even in the absence of installation on a vehicle. Proceeding from the active position thereby ascertained, the inactive position can also be ascertained because of the unequivocal kinematics of the motion guide. The displacement of the wheel spoiler from the active position into the inactive position not only comprises a displacement of the wheel spoiler relative to the wheel spoiler carrier in a vertical direction orthogonally to the imaginary flow impingement direction, but also preferably comprises a displacement component parallel to the flow impingement direction. In the operationally ready state installed on the vehicle, the flow impingement direction is parallel to the roll axis of the vehicle.

In principle, the aforementioned reversible deflection can be implemented on two physically different types of coupling members. According to a first embodiment, the reversible deflection can be implemented as Eulerian deflection of an Eulerian flexible beam. The coupling member then encompasses an Eulerian flexible beam. According to a second alternative embodiment, the reversible deflection can be implemented by bending a toggle linkage that is preloaded into the extended position constituting the first conformation. The coupling member then encompasses two toggle-linkage rods connected to yield a toggle linkage, the toggle linkage thereby formed being preloaded by a preload spring into the extended position that constitutes the first conformation.

The coupling member of the second embodiment preferably encompasses a preload spring that spans the toggle linkage and is force-transferringly coupled at each of its two spring ends to a different one of the two toggle-linkage rods, The toggle-linkage rods themselves preferably are not deformable. For easier deformability of the coupling member of the second embodiment, an articulation axis of the toggle linkage encloses an angle of between 75° and 90°, preferably a right angle, with the expected collision direction, i.e. with the roll axis of the motor vehicle that carries the wheel spoiler arrangement.

A coupling member of the aforementioned first embodiment which is sufficiently rigid to transfer displacement forces from the displacement drive system to the wheel spoiler during normal operation, while still having low weight and guaranteed deformability, can be obtained by the fact that the coupling member comprises a material strip that extends along a longitudinal strip axis. The length of the material strip is preferably approximately four to six times its width. Its width is also preferably at least six to eight times its thickness. The material of the material strip can be a metal or a plastic. The plastic can be filled with particles and/or can contain at least one reinforcing metal structure or plastic structure, for example a reinforcing component that extends in a longitudinal direction of the material strip and is molded on by the plastic of the material strip or is overmolded thereby. In the case of a reinforcing component made of plastic, the material of the reinforcing component differs from that of the remainder of the material strip made of plastic.

Even though the coupling member has small dimensions, in particular even though the thickness of the material strip is small, defined reversible deflection of the coupling member of the first embodiment only in the context of a relatively high limit load can be achieved by the fact that the material strip is curved around an axis of curvature parallel to the longitudinal strip axis. A material strip curved uniaxially in its longitudinal direction, in the form of a sheet-metal strip, is known e.g. from metal tape measures that can be pulled out from a roller against a preload.

Preferably, the material strip in the first conformation is curved only around the axis of curvature that is curved with respect to the longitudinal strip axis. The predetermined limit load can be established by selecting the thickness of the material strip, the width of the material strip, the length of the material strip, and the intensity of the curvature of the material strip. A further parameter that influences the limit load is the material of the material strip. The length of the material strip in this context is its longest dimension, which preferably proceeds from the displacement drive system to the motion guide or to the wheel spoiler, depending on the component arrangement, from among the motion guide and wheel spoiler, to which the coupling member is coupled at its drive-system-distal longitudinal end. The width of the material strip is orthogonal to the length and orthogonal to the thickness. The thickness of the material strip, especially when it is embodied as a sheet-metal strip, as a rule is less than a millimeter, preferably less than 0.6 mm.

Particularly good repeatable reversible deflection of a material strip, in particular of a curved material strip as described above, can be achieved by the fact that the material strip encompasses spring steel. The material strip, constituting a sheet-metal strip, is preferably produced from spring steel. Strip spring steel is appropriate as a spring steel that is particularly suitable for constituting a reversibly deflectable material strip, and requires little production outlay for creating the material strip. It is immaterial in this context whether the strip spring steel contributes along with other components to constituting the material strip of the coupling member, or constitutes it entirely by itself.

It is the case for both of the aforementioned embodiments of coupling members that the displacement drive system can in principle be any displacement drive system, for example a piston-cylinder arrangement, the coupling member being capable of being arranged between the piston rod of the piston-cylinder arrangement and the motion guide or the wheel spoiler. The displacement drive can transfer particularly large forces, however, if it is a crank mechanism. The coupling member can then constitute a toggle-linkage articulation together with a crank on the output shaft of the motor of the displacement drive system. In the active position, the toggle-linkage/crank mechanism thereby constituted can assume an extended or almost-extended position. As already indicated above, the coupling member can be motion-transferringly coupled at its drive-system-distal longitudinal end either to a component of the motion guide or directly to the wheel spoiler. The crank can be the aforementioned output member of the displacement drive system.

To clarify: in the case in which the coupling member, in the second embodiment recited above, is used as a toggle-linkage structure preloaded into the extended position, the coupling member, which itself encompasses a toggle linkage, forms a higher-order toggle linkage together with the crank.

With the embodiment as a crank mechanism, a return deformation of the coupling member from the second conformation back into the first conformation can be initiated or assisted in both simple and effective fashion by a revolution or partial revolution of the crank.

What happens in the context of a collision is usually the following: Prior to the collision, the wheel spoiler is in the active position, i.e. the crank of the displacement drive system is also in a position that is operationally associated with the active position.

As a result of a collision with an object, the wheel spoiler becomes displaced from the inactive position toward or indeed into the active position, accompanied by deformation of the coupling member, while the crank remains in the position associated with the active position. The fact that it remains in the position associated with the active position is one of the causes of the deformation of the coupling member.

Because, in the case of the above-described preferred flexible beam constituting a coupling member, the deformed second conformation can also be a stable or at least metastable conformation, the wheel spoiler that has been displaced by the impacting object toward or into the inactive position can remain in the inactive position even after cessation of the collision force. The coupling member can likewise remain in its deformed second conformation. As a result of movement of the crank from the operating position associated with the active position of the wheel spoiler into a position associated with the displaced position of the wheel spoiler which has now been reached, the crank can excite the coupling member to deform back as a result of its own spring effect, or can assist its return deformation. The coupling member can thus be deformed securely and reliably back into the first conformation, which preferably is a straight-line, extended conformation of the coupling member, in particular of the aforementioned material strip, particularly preferably of the curved material strip.

The deformation, from the first conformation into the second conformation, of the coupling member which protects the wheel spoiler in the event of a collision preferably occurs against an elasticity of the coupling member which ensures, immediately after cessation of the collision force, a return deformation back into the first conformation. In the case of the Eulerian flexible beam, that elasticity is a material- and shape-related elasticity of the material strip, and in the case of the preloaded toggle-linkage structure it is the elastic force of the preload spring. This elastically restoring deformation back into the first conformation can be initiated or assisted by the motion of the displacement drive system as described above.

As the connection of a crank mechanism to the motion guide or to the wheel spoiler, the coupling member is preferably coupled at its drive-system-proximal longitudinal end articulatedly to the crank of the crank mechanism. The coupling member in its first embodiment is therefore, considered in the abstract, preferably an Eulerian flexible beam of the second or third Eulerian deflection class, in which at least one longitudinal end of the Eulerian flexible beam is supported articulatedly.

Although it has been stated above that the crank of the crank mechanism can be arranged directly on the output shaft of a motor of the displacement drive system, it is not to be excluded that the crank is coupled via a transmission and/or a linkage to the output member of a motor or generally of an actuator. That actuator can in turn be a piston-cylinder arrangement, for example if the piston rod is embodied at least in portions as a toothed rack or is coupled to a toothed rack.

The coupling member is preferably also coupled at its drive-system-distal longitudinal end articulatedly to the motion guide and/or to the wheel spoiler. This means that, particularly preferably, the coupling member in its first embodiment is an Eulerian flexible beam of the second Euler class, i.e. with articulated clamping or support at both ends. In order to be connected with as little stress as possible at the articulated connections of the coupling member, to the crank on the one hand and/or to the motion guide or the wheel spoiler on the other hand, at least one articulated connection of the coupling member to the crank, or to the motion guide or wheel spoiler, is configured as a ball joint; preferably, both articulated connections are configured as ball-joint connections. With the preferred ball joints, operation-related deformations due to wind loads, rain, etc. can occur on the wheel spoiler in the active position without resulting in excessive stresses in the connecting joints to the coupling member.

Regardless of the configuration of the coupling member, the motion guide can also be any motion guide. It can be a plain guide or a linear guide; the latter is usually too complex for a wheel spoiler, but a motion guide of that kind is nevertheless also to be encompassed by the present invention. The motion guide preferably encompasses a four-joint linkage. Once again, for the reasons already recited above involving maximally comprehensive avoidance of stress at the joints and in the arms of the four-joint linkage as well, a plurality of joints, particularly preferably all joints, are embodied as ball joints.

The present invention also relates to a motor vehicle having a wheel spoiler arrangement as described above, the wheel spoiler carrier being arranged in vehicle body-mounted fashion.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
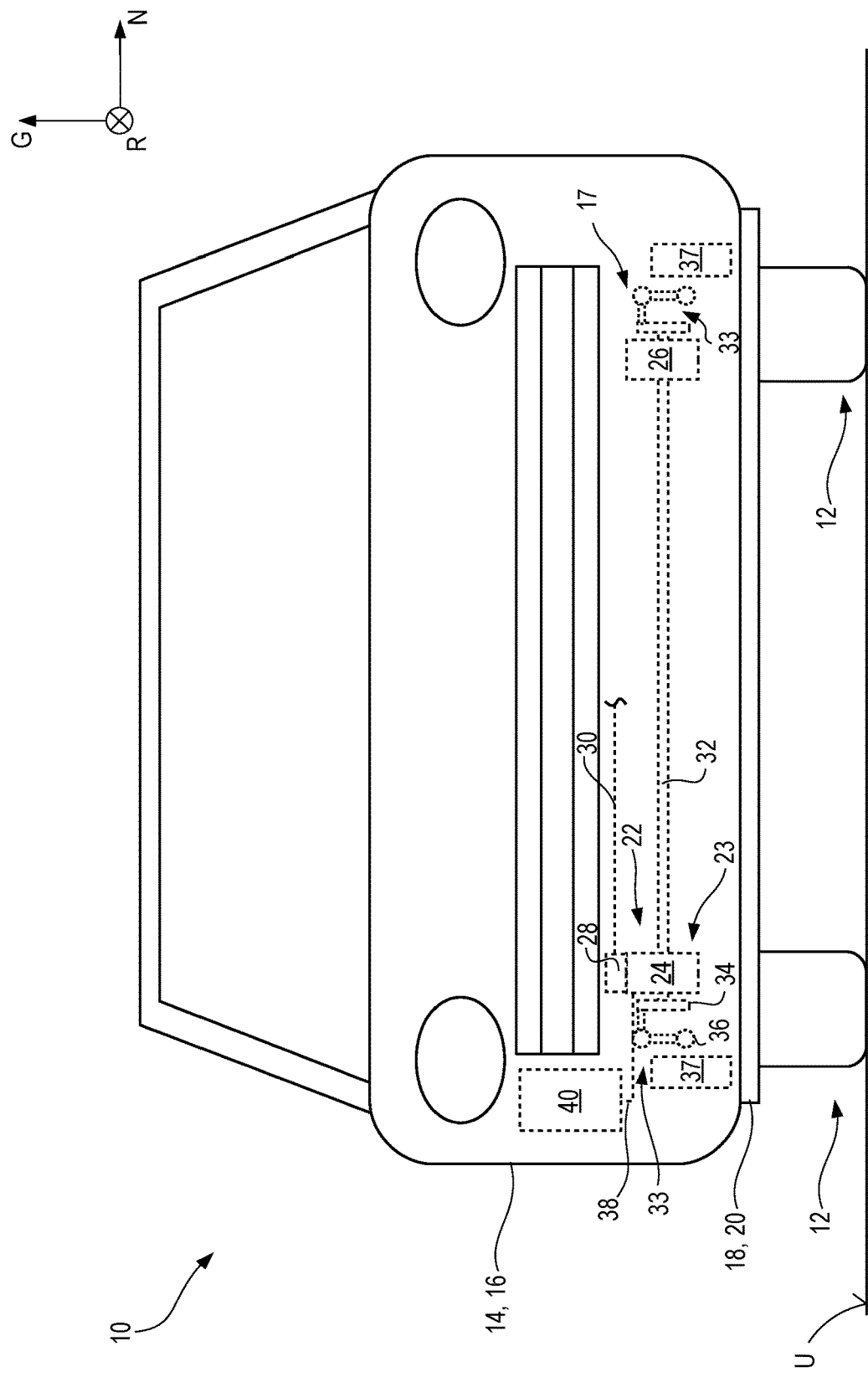
FIG. 1 is a schematic front view, looking along the roll axis of the motor vehicle, of a motor vehicle having a wheel spoiler arrangement according to the present invention, the wheel spoiler being in the inactive position.

Referring now to the drawings wherein the showings are for the purpose of illustrating preferred and alternative embodiments of the invention only and not for the purpose of limiting the same, in FIG. 1, an embodiment according to the present invention of a motor vehicle of the present Application is labeled in general with the number 10. Motor vehicle 10, depicted merely schematically, is viewed from the front along roll axis R. Also extending along roll axis R is the flow impingement direction along which wind blast impinges upon vehicle 10 in the context of forward travel. Two front wheels 12 of motor vehicle 10 carry a vehicle body 14 above a substrate U on which motor vehicle 10 is rollably supported. Vehicle body 14 constitutes a first motor vehicle portion 16.

A wheel spoiler arrangement 17, having an active wheel spoiler 18 that constitutes a second motor vehicle portion 20 displaceable relative to vehicle body 14, is arranged in the front end region of motor vehicle 10 and in front of front wheels 12. In the exemplifying embodiment depicted, active wheel spoiler 18 is movable between its operating positions parallel to yaw axis G of motor vehicle 10. In an even more greatly preferred embodiment, it is also movable between its operating positions parallel to roll axis R of motor vehicle 10. For better orientation, the axes of the Cartesian motor-vehicle coordinate system, comprising yaw axis G, pitch axis N, and roll axis R, are depicted in a coordinate-axis triangle. In FIG. 1, wheel spoiler 18 is in its inactive position.

In order to bring about the relative motion of active wheel spoiler 18 relative to vehicle body 14, motor vehicle 10 comprises an actuator arrangement 22 having a displacement drive system 23 encompassing an actuator 24, and having an output drive shaft bearing 26 located remotely from actuator 24 in a pitch-axis direction. A control apparatus 28 is physically integrated into actuator 24.

Control apparatus 28, having one or several integrated circuits, also handles communication tasks and thus data communication between actuator 24 and the onboard electronic system of the remainder of motor vehicle 10. Control apparatus 28, and thus actuator 24, are connected for that purpose, via a data lead 30 that is merely indicated, to the onboard electronic system of the remainder of motor vehicle 10. Data lead 30 is preferably part of a data bus.

In the example depicted, actuator 24 in the form of a rotary electric motor drives an output shaft 32 that passes through it. Drive shaft 32 also passes through drive shaft bearing 26, where the drive shaft is supported again because of the long protrusion length proceeding from actuator 24.

Actuator 24 and output drive shaft bearing 26 thus each have a side facing toward one another and an opposite side facing away from one another, from each of which drive shaft 32 protrudes. Output drive shaft 32 protrudes with only a short protrusion length on those sides of actuator 24 and of output drive shaft bearing 26 which face away from one another.

A transfer arrangement 33 adjoins each of the longitudinal end regions of the short-protrusion output drive shaft portions, transfer arrangements 33 on the actuator 24 side and on the output drive shaft bearing 26 side being arranged substantially with identical components but mirror-symmetrically with reference to a mirror symmetry plane parallel to roll axis R and to yaw axis G. It is therefore sufficient to describe only one transfer arrangement 33, a description of which also applies, under the aforesaid symmetry condition, to the respective other transfer arrangement 33.

Transfer arrangements 33 each comprise a crank 34, connected for rotary motion together with output drive shaft 32 around longitudinal output drive shaft axis A, constituting a part of displacement drive system 23. An output drive peg, bent with reference to output drive shaft 32, of crank 34 is articulately connected to a coupling member 36. Coupling member 36 is articulately connected, at its longitudinal end remote from the output drive peg, to wheel spoiler 18. In the regions in which actuator 24 and output drive bearing 26 are respectively arranged, at least one motion guide 36 guides wheel spoiler 18 to move between its operating positions. The actuator housing of actuator 24, and output drive bearing 26, are supported on vehicle body 14.

For energy delivery, electrical actuator 24 is connected to vehicle battery 40, constituting an electrical energy source, via a supply lead 38 that feeds into actuator 24.

Actuator 24 is therefore energy-transferringly connected to vehicle battery 38, such that as a function of data signals received by control apparatus 28 via data lead 30, control apparatus 28 of actuator 24 either does or does not cause actuator 24 to be energized, and thus to switch from an inactive passive state into a force- and motion-outputting operating state.

Figure 2:
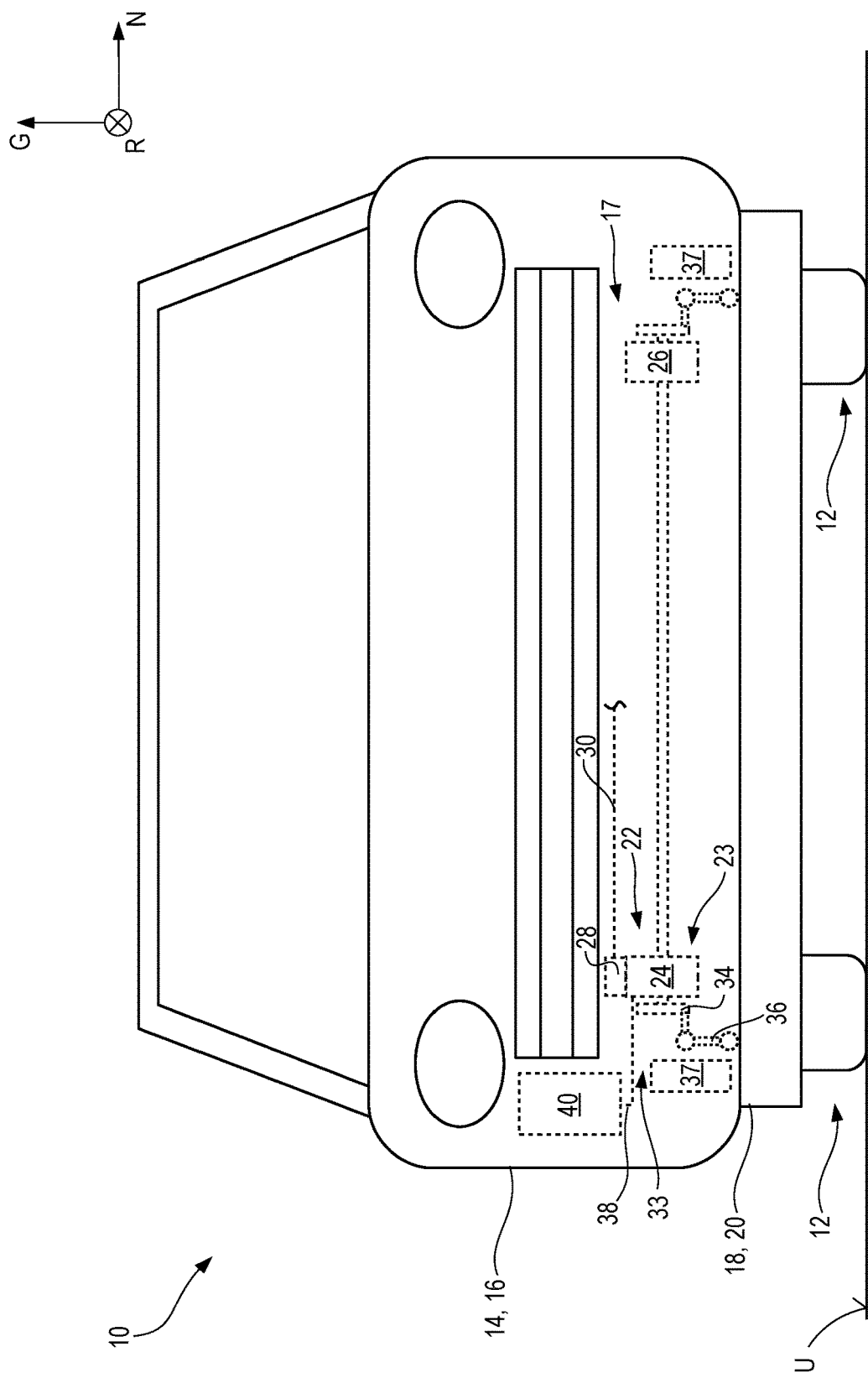
FIG. 2 is the view of the FIG. 1 with the wheel spoiler in the active position.

FIG. 2 shows motor vehicle 10 of FIG. 1 after a displacement of wheel spoiler 18 closer to substrate U, as occurs e.g. when motor vehicle 10 is traveling continuously at a speed that is typical of driving outside built-up areas on main highways or expressways, for example at more than 70 km/h.

Wheel spoiler 18 has been displaced parallel to yaw axis G.

Beyond merely switching the energy supply to actuator 24 on and off, control apparatus 28 of actuator 24 can also influence the magnitude of that energy supply over the duration of the operating state of actuator 24, for example in such a way that the motion of output drive shaft 32 comprises a startup ramp at constant acceleration from a stop, a motion phase at a constant high speed, and a deceleration ramp at constant acceleration to a stop.

Figure 3:
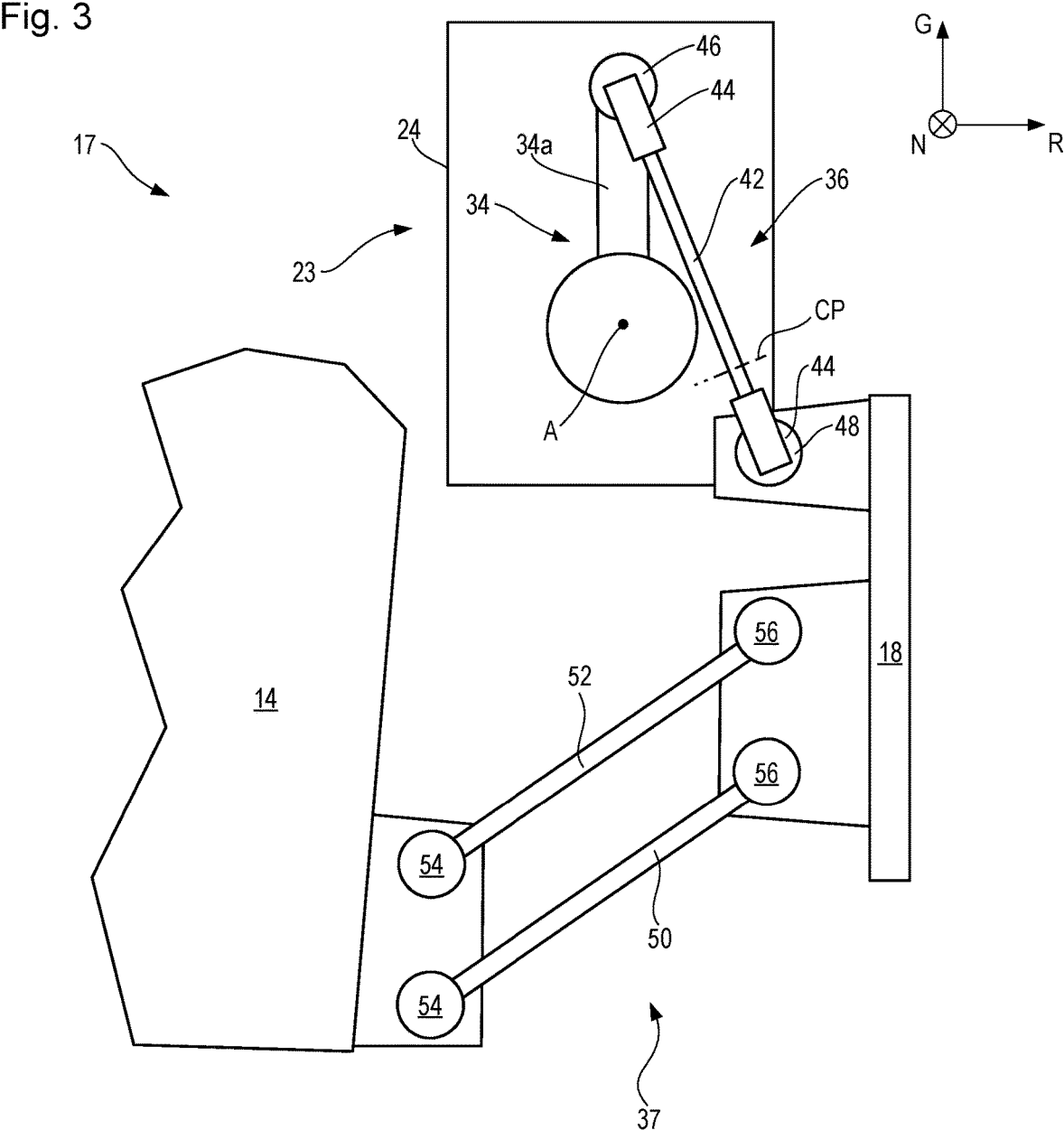
FIG. 3 is a schematic depiction, looking along the pitch axis of the motor vehicle or in a longitudinal direction of the wheel spoiler, of the wheel spoiler arrangement of FIGS. 1 and 2 with the wheel spoiler in the inactive position.

FIG. 3 is a schematic depiction of the functional relationships among actuator 34, motion guide 37, wheel spoiler 18, and vehicle body 14. Actuator 24 is fixedly connected to vehicle body 14.

Wheel spoiler 18 is in its inactive position in FIG. 3. Crank 34, which is rotatable around longitudinal output drive shaft axis A that is orthogonal to the drawing plane of FIG. 3, is in an operating position which is associated with the inactive position of wheel spoiler 18 and in which coupling member 36 is sharply angled with respect to crank arm 34a that protrudes from output drive shaft 32. Crank 34 and coupling member 36 form a toggle linkage.

In this embodiment, coupling member 36 is embodied as an Eulerian flexible beam and encompasses a sheet-metal strip 42 that is mounted at both of its longitudinal ends via a respective coupling piece 44. Coupling piece 44 is coupled to sheet-metal strip 42 at one functional region, for example using set screws, and at its other functional region is part of a ball joint. Ball joint 46 couples drive-system-proximal coupling piece 44 to crank 34. Ball joint 48 couples drive-system-distal coupling piece 44 to wheel spoiler 18.

The longitudinal axis of sheet-metal strip 42 proceeds parallel to the drawing plane of FIG. 3. A detail view in section plane CP shows the configuration of sheet-metal strip 42, curved around an axis of curvature parallel to the longitudinal axis of sheet-metal strip 42. Section plane CP is orthogonal to the longitudinal axis of sheet-metal strip 42.

Because sheet-metal strip 42 has a single-axis curved configuration in the first conformation, said strip, even though it has little material thickness (preferably less than 0.6 mm), is sufficiently rigid to transfer drive force from actuator 24 via crank 34 to wheel spoiler 18 during normal operation.

In the preferred exemplifying embodiment that is depicted, motion guide 37 is a four-joint linkage having two arms 50 and 52 which are articulated at their one longitudinal end on vehicle body 14 via ball joints 54, and are articulated with their oppositely located longitudinal ends, located closer to wheel spoiler 18, on wheel spoiler 18 by means of ball joints 56.

Figure 4:
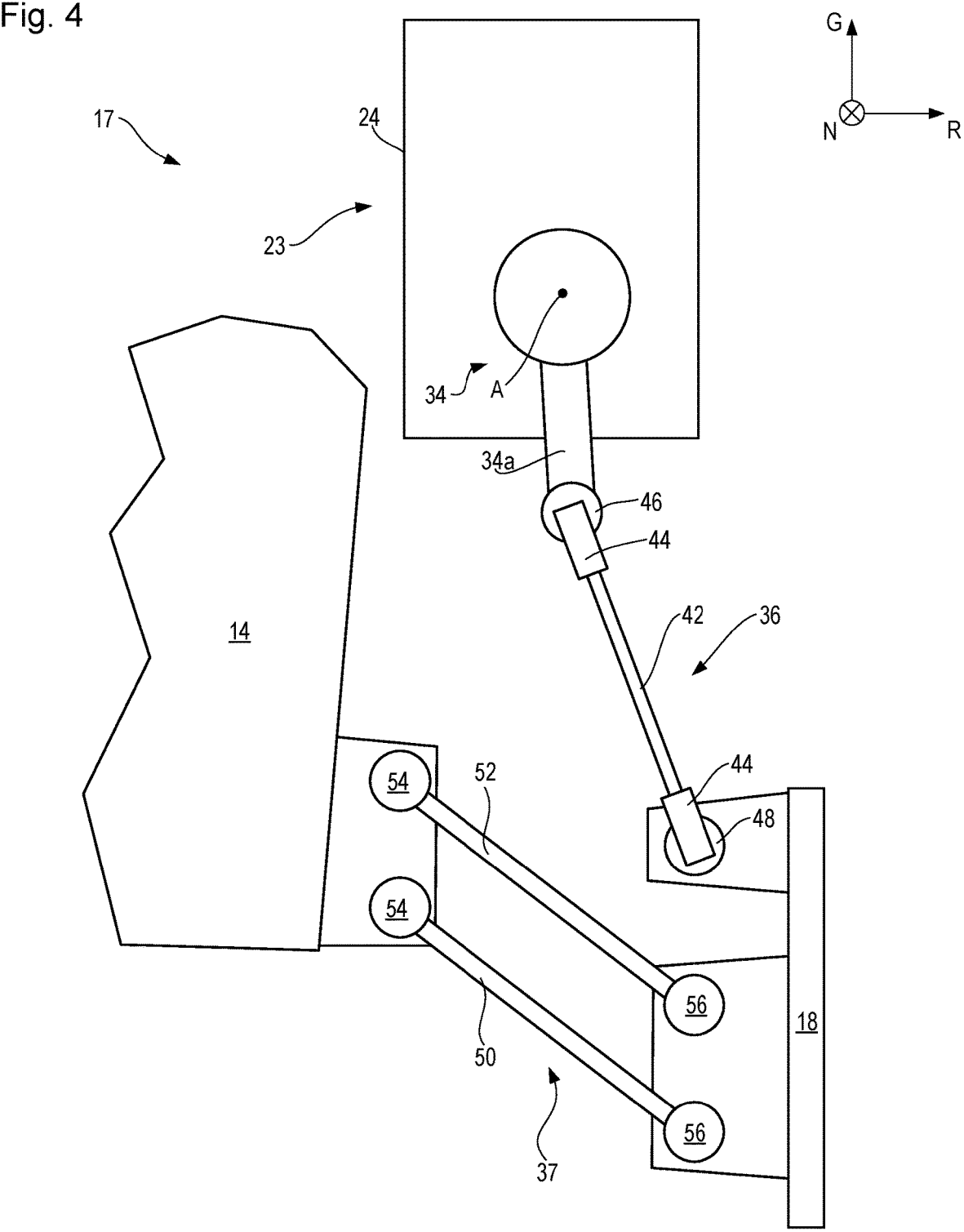
FIG. 4 is the view of FIG. 3 with the wheel spoiler in the active position.
Figure 5:
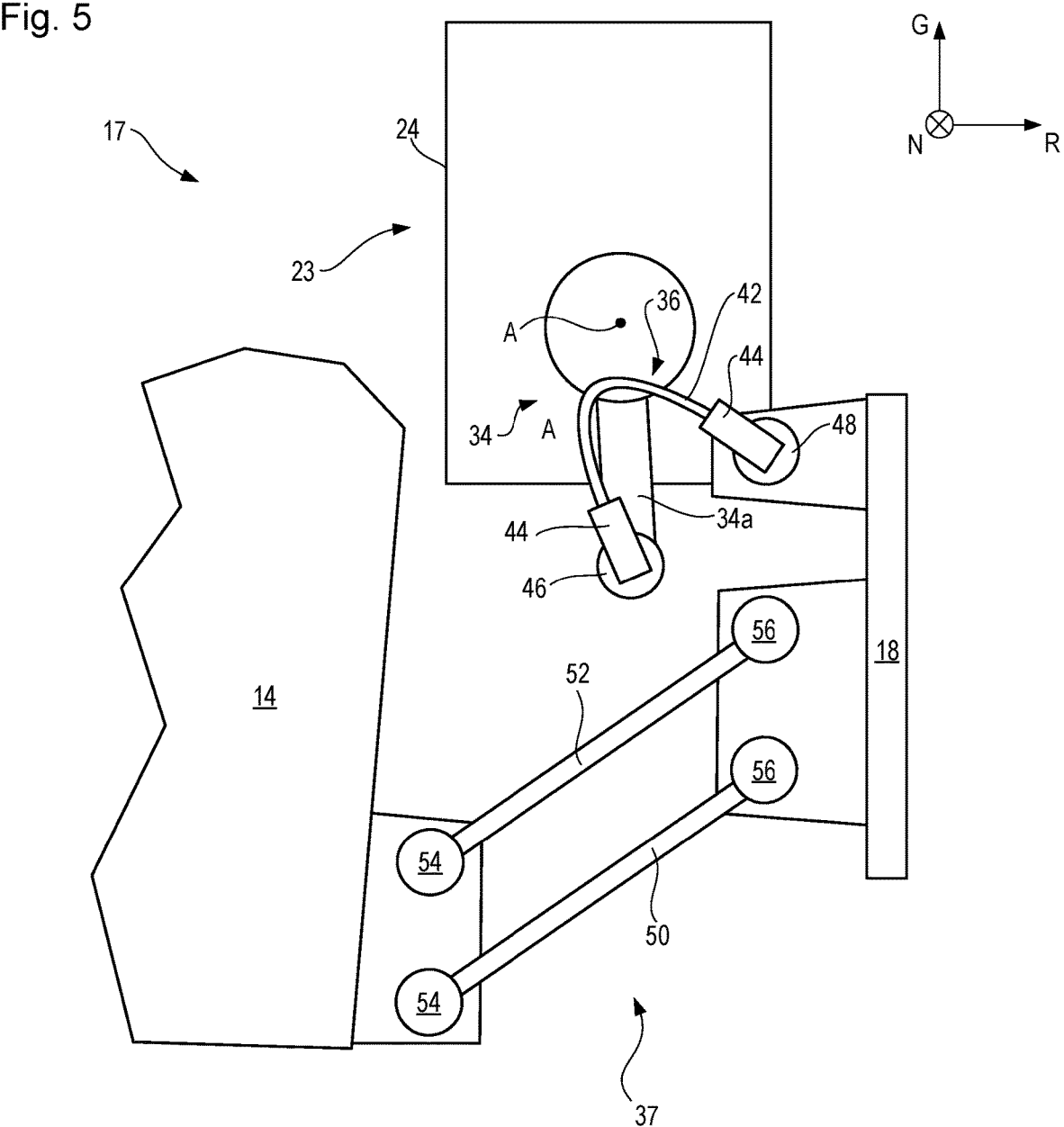
FIG. 5 is the view of the wheel spoiler arrangement of FIGS. 3 and 4 with the wheel spoiler in the inactive position after a collision, the displacement drive system being in a position associated operationally with the active position.

For the sake of simplicity, the four-joint linkage of motion guide 37 is depicted in FIGS. 3 to 5 as a parallelogram arm linkage. In reality, however, the four-joint arm linkage will have a configuration that deviates from a parallelogram arm linkage, i.e. the four rotation axes of the four-joint linkage do not constitute the edges of a cuboid in any operating position, so that the motion path of the wheel spoiler between its operating positions has a component not only along yaw axis G but preferably also along roll axis R. The simplified depiction as a parallelogram arm link is nevertheless sufficient to explain the function of motion guide 37 in interaction with displacement drive system 33.

FIG. 4 depicts displacement drive system 33, wheel spoiler 18, and motion guide 37 after a displacement of crank 34 through approximately half a revolution around longitudinal output drive shaft axis A. Wheel spoiler 18 is in its active position.

In contrast to FIGS. 3 and 4, which each depict operating positions of wheel spoiler arrangement 17 in normal operation, FIG. 5 shows a special operating position after collision with an object. Wheel spoiler 18 has been moved back into the inactive position by the collision. As in normal operation, that motion has again been guided by motion guide 37.

Sheet-metal strip 42, and thus coupling member 36, have been reversibly deflected by the force exerted upon collision with the object. Crank 34 of displacement drive system 33 is still in the operating position associated with the active position of wheel spoiler 18, since displacement drive system 33 had most recently, during normal operation, displaced wheel spoiler 18 into the active position.

The dimensioning of sheet-metal strip 42, i.e. the selection of the sheet thickness, curvature, length, and width of the sheet-metal strip, is an indication of the limit load on coupling member 36 above which, when it is in the position shown in FIG. 4, it deforms together with displacement drive system 33 into the second conformation shown in FIG. 5. The extended conformation of coupling member 36 in FIGS. 3 and 4 is the first conformation of the coupling member. The thickness of the sheet-metal strip can in fact be less than 0.2 mm.

A rotation of crank 34 into the position shown in FIG. 3, which is associated with the inactive position of the wheel spoiler and which wheel spoiler 18 actually assumed after the collision in accordance with FIG. 5, initiates and/or assists a deformation of coupling member 36 back into the first, extended conformation, so that wheel spoiler arrangement 17 can resume its normal operation after that return deformation. Return deformation of the coupling member back into the first conformation can nevertheless also be brought about, after cessation of the collision force, solely by way of elastic recovery forces of sheet-metal strip 42.

Sheet-metal strip 42 of coupling member 36 is preferably manufactured from a strip of spring steel, so that it is repeatedly deformable between the two conformations (first conformation shown in FIGS. 3 and 4 and second conformation shown in FIG. 5) without residual deformation.

Figure 6A:
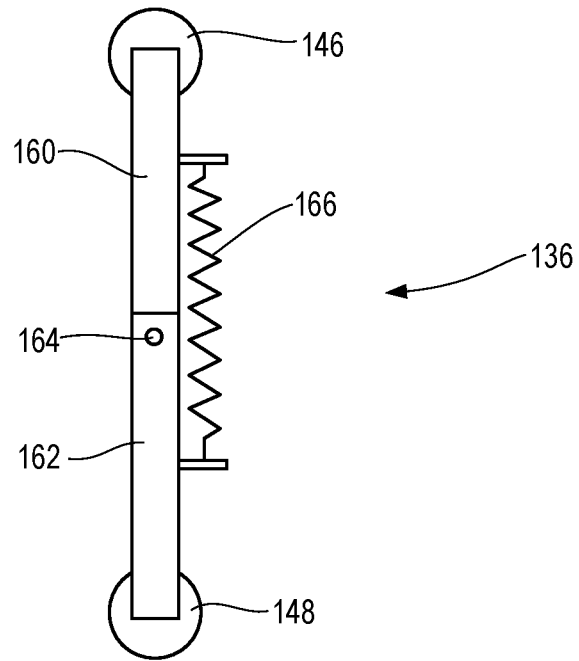
FIG. 6A shows an alternative embodiment, with reference to FIGS. 1 to 5, of a coupling member in the first conformation.
Figure 6B:
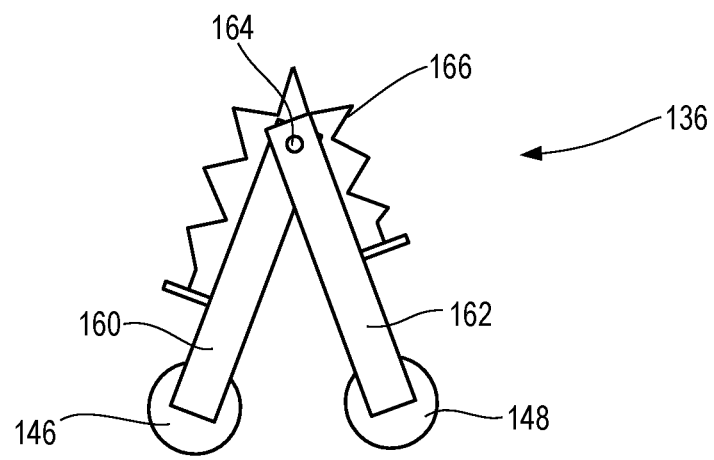
FIG. 6B shows the alternative embodiment of a coupling member of FIG. 6A in the second conformation.

FIGS. 6A and 6B depict an alternative embodiment of a coupling member. Components that are identical and functionally identical to those depicted in the first embodiment of coupling member 36 depicted in FIGS. 1 to 5 are labeled in FIGS. 6A and 6B with the same reference characters but incremented by 100.

The second embodiment of a coupling embodiment 136 will be described below only insofar as it differs from the first embodiment, to the description of which reference is otherwise also made for a description of coupling member 136 of the second embodiment.

The second embodiment of coupling member 136 can replace, in FIGS. 1 to 5, the first embodiment shown therein in the form of a flexible beam. The coupling-member-side ball-joint parts 146 and 148 are configured for that purpose identically to the coupling-member-side ball-joint parts 46 and 48 of the first embodiment.

Coupling member 136 of the second embodiment is not a flexible beam but is instead a toggle-joint structure having a first toggle-joint beam 160 and a second toggle-joint beam 162 which are bendably connected to one another by a rotary joint 164. In FIGS. 6A and 6B, the rotation axis of toggle joint 164 proceeds orthogonally to the drawing plane of FIGS. 6A and 6B.

The two toggle-joint beams 160 and 162 are shown in FIG. 6A in their extended position of the first conformation, into which they are preloaded by a preload spring 166.

Starting from the extended position shown in FIG. 6A, toggle-joint beam 160 can be rotated around rotary joint 164 only counter-clockwise (as seen in FIG. 6A) relative to toggle-joint beam 162. A clockwise relative rotation beyond the extended position shown in FIG. 6A is not possible. Toggle-joint beam 162 likewise can be rotated around toggle joint 164 only clockwise relative to toggle-joint beam 160.

A rotation of toggle-joint beams 160 and 162 relative to one another around the rotary joint or toggle joint 164 always occurs against the preload of preload spring 166. The extended position shown in FIG. 6A corresponds to the first conformation as depicted for coupling member 36 of the first embodiment in FIGS. 3 and 4.

FIG. 6B shows a bent configuration of coupling member 136 in which the two toggle-joint beams 160 and 162 are bent relative to one another around toggle joint 164 against the preload force of preload spring 166. The position shown in FIG. 6B corresponds to the second conformation that coupling member 36 of the first embodiment exhibits in FIG. 5.

Coupling member 136 of the second embodiment, installed in the wheel spoiler arrangement of FIGS. 1 to 5, becomes deformed into the conformation shown in FIG. 6B when the wheel spoiler inadvertently collides with an object and must evade it.

After cessation of the collision load, preload spring 166 automatically shifts coupling member 136 back into the extended first conformation and thus moves the wheel spoiler back into the active position. This recovery motion can be assisted by a movement of crank 34.

By selecting a preload spring 166, in particular by selecting its spring stiffness, it is possible to specify a limit load above which coupling member 136 becomes deformed from the first, extended conformation into the second, bent conformation.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A wheel spoiler arrangement, encompassing: a wheel spoiler carrier; a wheel spoiler received displaceably relative to the wheel spoiler carrier between an inactive position and an active position constituting operating positions; a motion guide which is arranged between the wheel spoiler carrier and the wheel spoiler and guides the displacement of the wheel spoiler between its operating positions; and a displacement drive system which is coupled motion-transferringly to the wheel spoiler by a coupling member and is embodied and arranged to drive the wheel spoiler relative to the wheel spoiler carrier to perform a displacement motion between its operating positions, wherein the coupling member is a reversibly deformable component arrangement which has a first predetermined conformation under an operational load that does not exceed a predetermined limit load and which is embodied to deform into a second conformation, different from the first conformation, under an extraordinary load that exceeds the predetermined limit load, the reversibly deformable component arrangement being deformable from the second conformation back into the first conformation, wherein the coupling member is embodied as an elastic Eulierian flexible beam.

2. The wheel spoiler arrangement according to claim 1, wherein the coupling member comprises two toggle-linkage rods that constitute a toggle linkage and are preloaded by a preload spring into the first predetermined conformation.

3. The wheel spoiler arrangement according to claim 2, wherein the first predetermined conformation is an extended conformation.

4. The wheel spoiler arrangement according to claim 1, wherein the coupling member comprises a material strip that extends along a longitudinal strip axis.

5. The wheel spoiler arrangement according to claim 4, wherein the material strip is curved around an axis of curvature parallel to the longitudinal strip axis.

6. The wheel spoiler arrangement according to claim 4, wherein the material strip encompasses spring steel.

7. The wheel spoiler arrangement according to claim 6, wherein the material strip includes at least one of strip spring steel and a sheet-metal strip from spring steel.

8. The wheel spoiler arrangement according to claim 1, wherein the displacement drive system is a crank mechanism.

9. The wheel spoiler arrangement according to claim 8, wherein the coupling member couples a crank, drivable by a motor to rotate around a crank axis, to at least one of the motion guide and the wheel spoiler.

10. The wheel spoiler arrangement according to claim 9, wherein the coupling member is coupled at its drive-system-proximal longitudinal end articulatedly to the crank.

11. The wheel spoiler arrangement according to claim 1, wherein the coupling member is coupled at its drive-system-distal longitudinal end articulatedly to at least one of the motion guide and the wheel spoiler.

12. The wheel spoiler arrangement according to claim 10, wherein the coupling member is coupled at its drive-system-distal longitudinal end articulatedly to at least one of the motion guide and the wheel spoiler.

13. The wheel spoiler arrangement according to claim 1, wherein the motion guide encompasses a four-joint linkage.

14. The wheel spoiler arrangement according to claim 1, wherein the motion guide encompasses a plurality of joints.

15. A motor vehicle having a wheel spoiler arrangement according to claim 1, the wheel spoiler carrier being arranged in vehicle body-mounted fashion.

16. A wheel spoiler arrangement, encompassing: a wheel spoiler carrier; a wheel spoiler received displaceably relative to the wheel spoiler carrier between an inactive position and an active position constituting operating positions; a motion guide which is arranged between the wheel spoiler carrier and the wheel spoiler and guides the displacement of the wheel spoiler between its operating positions; and a displacement drive system which is coupled motion-transferringly to the wheel spoiler by a coupling member and is embodied and arranged to drive the wheel spoiler relative to the wheel spoiler carrier to perform a displacement motion between its operating positions, wherein the coupling member is a reversibly deformable component arrangement which has a first predetermined conformation under an operational load that does not exceed a predetermined limit load and which is embodied to deform into a second conformation, different from the first conformation, under an extraordinary load that exceeds the predetermined limit load, the reversibly deformable component arrangement being deformable from the second conformation back into the first conformation, wherein the displacement drive system is a crank mechanism, wherein the coupling member couples a crank, drivable by a motor to rotate around a crank axis, to at least one of the motion guide and the wheel spoiler, and wherein the coupling member is coupled at its drive-system-proximal longitudinal end articulatedly to the crank by a ball joint.

17. A wheel spoiler arrangement, encompassing: a wheel spoiler carrier; a wheel spoiler received displaceably relative to the wheel spoiler carrier between an inactive position and an active position constituting operating positions; a motion guide which is arranged between the wheel spoiler carrier and the wheel spoiler and guides the displacement of the wheel spoiler between its operating positions; and a displacement drive system which is coupled motion-transferringly to the wheel spoiler by a coupling member and is embodied and arranged to drive the wheel spoiler relative to the wheel spoiler carrier to perform a displacement motion between its operating positions, wherein the coupling member is a reversibly deformable component arrangement which has a first predetermined conformation under an operational load that does not exceed a predetermined limit load and which is embodied to deform into a second conformation, different from the first conformation, under an extraordinary load that exceeds the predetermined limit load, the reversibly deformable component arrangement being deformable from the second conformation back into the first conformation, wherein the coupling member is coupled at its drive-system-distal longitudinal end articulatedly to at least one of the motion guide and the wheel spoiler by a ball joint.

18. A wheel spoiler arrangement, encompassing: a wheel spoiler carrier; a wheel spoiler received displaceably relative to the wheel spoiler carrier between an inactive position and an active position constituting operating positions; a motion guide which is arranged between the wheel spoiler carrier and the wheel spoiler and guides the displacement of the wheel spoiler between its operating positions; and a displacement drive system which is coupled motion-transferringly to the wheel spoiler by a coupling member and is embodied and arranged to drive the wheel spoiler relative to the wheel spoiler carrier to perform a displacement motion between its operating positions, wherein the coupling member is a reversibly deformable component arrangement which has a first predetermined conformation under an operational load that does not exceed a predetermined limit load and which is embodied to deform into a second conformation, different from the first conformation, under an extraordinary load that exceeds the predetermined limit load, the reversibly deformable component arrangement being deformable from the second conformation back into the first conformation, wherein the motion guide encompasses a plurality of joints and wherein the plurality of joints are ball joints.

* * * * *